United States Patent
Burke

(10) Patent No.: US 6,669,165 B2
(45) Date of Patent: Dec. 30, 2003

(54) SOLENOID VALVE ASSEMBLY

(75) Inventor: David Howard Burke, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 154 days.

(21) Appl. No.: 09/947,858

(22) Filed: Sep. 6, 2001

(65) Prior Publication Data

US 2003/0042452 A1 Mar. 6, 2003

(51) Int. Cl.$^7$ ................................................ F16K 31/02
(52) U.S. Cl. .................... 251/102; 251/129.15; 251/297
(58) Field of Search ............................ 251/129.15, 297, 251/101, 102, 111, 113

(56) References Cited

U.S. PATENT DOCUMENTS

| | | | | |
|---|---|---|---|---|
| 2,224,147 A | * | 12/1940 | Ehlers | 251/70 |
| 2,310,745 A | * | 2/1943 | Parks et al. | 251/297 |
| 3,385,559 A | * | 5/1968 | Churchill | 251/70 |
| 3,666,231 A | * | 5/1972 | Parodi et al. | 251/297 |
| 5,189,991 A | * | 3/1993 | Humburg | 251/129.1 |
| 5,535,725 A | * | 7/1996 | Baker et al. | 251/129.15 |
| 5,584,465 A | * | 12/1996 | Ochsenreiter | 251/129.05 |
| 5,630,403 A | * | 5/1997 | Van Kampen et al. | 251/129.17 |
| 6,129,115 A | * | 10/2000 | Janssen et al. | 251/129.15 |
| 6,267,351 B1 | * | 7/2001 | Schneider | 251/129.1 |
| 6,273,396 B1 | * | 8/2001 | Kato | 251/129.21 |

* cited by examiner

*Primary Examiner*—John Bastianelli
(74) *Attorney, Agent, or Firm*—Jimmy L. Funke

(57) ABSTRACT

A solenoid valve assembly for a vehicle includes a barrel and a solenoid disposed in the barrel for connection to a source of power. The solenoid valve assembly also includes a movable plunger disposed in the barrel and cooperating with the solenoid and a latch connected to the plunger and cooperating with the barrel to maintain the plunger in either one of an open state and closed state.

28 Claims, 3 Drawing Sheets

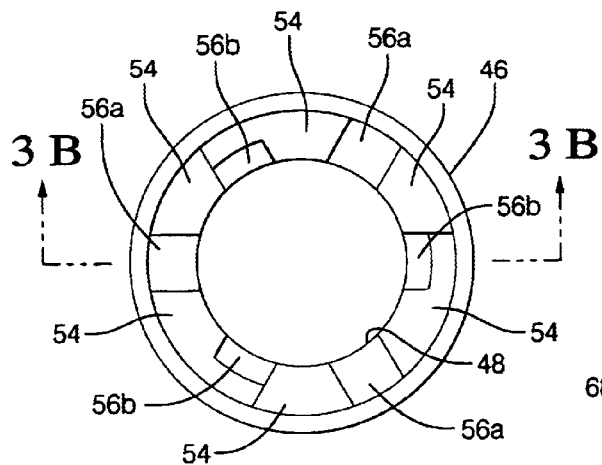
FIG. 3 A
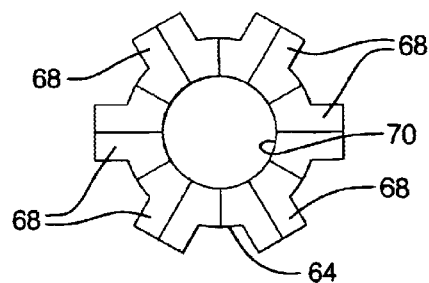
FIG. 4 A
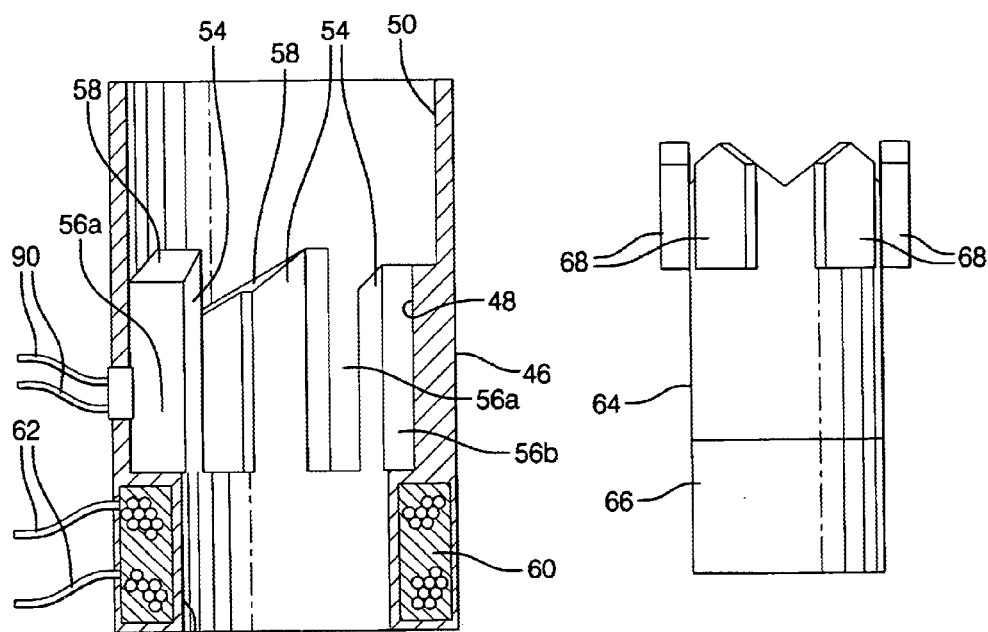
FIG. 3 B
FIG. 4 B

SOLENOID VALVE ASSEMBLY

TECHNICAL FIELD

The present invention relates generally to fuel systems for vehicles and, more particularly, to a solenoid valve assembly for a fuel system of a vehicle.

BACKGROUND OF THE INVENTION

It is known to provide a fuel system in a vehicle to hold and supply fuel to an engine of the vehicle. It is also known to provide a vapor recovery and storage system for the fuel system of the vehicle. Typically, the vapor recovery and storage system includes a vapor canister remotely mounted, such as in an engine compartment of the vehicle, and operatively connected by separate external valves and lines to a fuel tank of the fuel system.

It is also known to use a normally open or normally closed solenoid valve to seal the fuel system of the vehicle to perform a vapor leak test. The fuel system is tested for vapor leaks by closing off an air vent on the vapor canister and pressurizing (positive or negative) the vapor recovery and storage system, then monitoring the pressure change. These tests can provide false results by excessive fuel sloshing and hot fuel returning from the engine. A better test is to seal the vapor recovery and storage system when the engine is turned off and to monitor pressure and temperature as the fuel cools. However, this requires a valve that can be closed for the test and then reopened after the test. In addition, the valve must have low power consumption.

Therefore, it is desirable to provide a solenoid valve assembly for a vapor canister to perform a leak test after the vehicle is shut down. It is also desirable to provide a vent solenoid valve assembly for a vapor canister that has low power consumption. It is further desirable to provide a solenoid valve assembly for a fuel system in a vehicle that lowers cost, lowers evaporative emissions, and is easier to package in a vehicle.

SUMMARY OF THE INVENTION

It is, therefore, one object of the present invention to provide a new solenoid valve assembly for a vapor canister of a vehicle.

It is another object of the pre sent invention to provide a solenoid valve assembly for a vapor canister of a vehicle that has a latching mechanism.

It is yet another object of the present invention to provide a solenoid valve assembly for a vapor canister to allow a leak test to be performed after the vehicle is shut down.

To achieve the foregoing objects, the present invention is a solenoid valve assembly including a barrel and a solenoid disposed in the barrel for connection to a source of power. The solenoid valve assembly also includes a movable plunger disposed in the barrel and cooperating with the solenoid and a latch connected to the plunger and cooperating with the barrel to maintain the plunger in either one of an open state and closed state.

One advantage of the present invention is that a new solenoid valve assembly is provided for a vapor canister of a vehicle. Another advantage of the present invention is that the solenoid valve assembly allows a leak test to be performed after the vehicle is shut down with minimal current draw from a vehicle battery, resulting in a more accurate test than one performed during driving. Yet another advantage of the present invention is that the solenoid valve assembly reduces power consumption versus conventional valves. Still another advantage of the present invention is that the solenoid valve assembly has a solenoid to actuate a retraction mechanism to alternately open and close a valve without requiring a constant power draw in either the open or closed position.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3A is a plan view of a barrel of the solenoid valve assembly of FIG. 2.

FIG. 3B is a sectional view taken along line 3B—3B of FIG. 3A.

FIG. 4A is a plan view of a plunger of the solenoid valve assembly of FIG. 2.

FIG. 4B is an elevational view of the plunger of FIG. 4A.

DESCRIPTION OF THE PREFERRED EMBODIMENT

Figure 1:
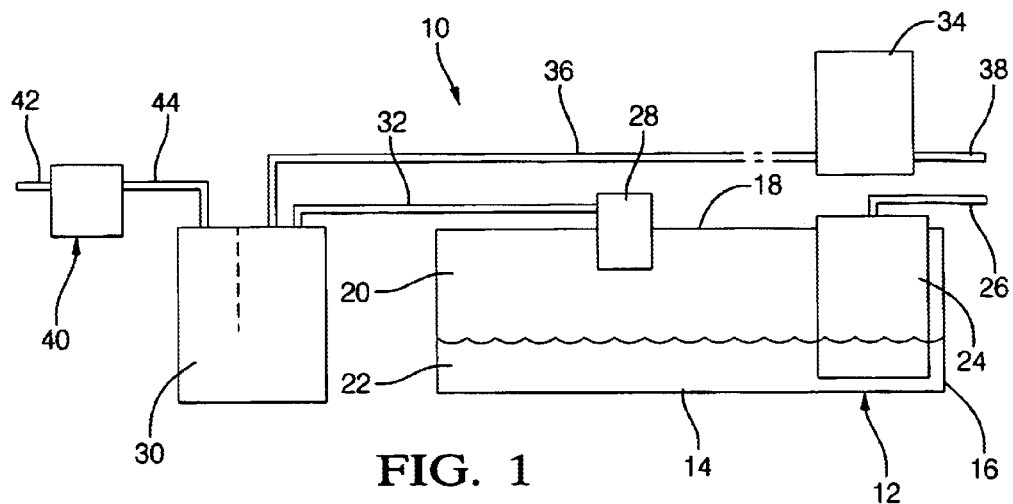
FIG. 1 is a diagrammatic view of a fuel system, according to the present invention.

Referring to the drawings and in particular FIG. 1, one embodiment of a fuel system 10, according to the present invention, is shown for a vehicle (not shown). The fuel system 10 includes a fuel tank, generally indicated at 12, to hold liquid fuel. In this embodiment, the fuel tank 12 includes a bottom or base wall 14 and a side wall 16 around a periphery of the base wall 14 and extending generally perpendicular thereto. The fuel tank 12 also includes a top wall 18 extending generally perpendicular to the side wall 16 to form an interior chamber 20 to hold fuel 22 therein. The fuel tank 12 is made of a rigid material, preferably a plastic material. It should be appreciated that the fuel tank 12 could be made of a metal material such as steel. It should also be appreciated that the fuel tank 12 is conventional and known in the art.

The fuel system 10 also includes a fuel pump module or fuel module reservoir assembly 24 disposed in the interior chamber 20 of the fuel tank 12 and a pressure fuel line or conduit 26 connected to the fuel module reservoir assembly 24 and connected to a fuel rail (not shown) of an engine (not shown) of the vehicle. It should be appreciated that the fuel module reservoir assembly 24 is conventional and known in the art.

The fuel system 10 further includes one or more fuel limiting vent valves and/or rollover valves 28 extending through the top wall 18 of the fuel tank 12 and into the interior chamber 20. It should be appreciated that the rollover valve 28 may be part of the fuel module reservoir assembly 24. It should also be appreciated that the rollover valve 28 is conventional and known in the art.

The fuel system 10 includes a vapor canister 30 preferably disposed outside of the fuel tank 12 and a fuel line 32 fluidly connected to the vapor canister 30 and the rollover valve 28. The vapor canister 30 includes a canister bed (not shown) disposed therein and made of a vapor absorbing material such as activated charchol. It should be appreciated that the vapor canister 30 is conventional and known in the art.

The fuel system 10 includes a purge solenoid 34 to control purging of fuel vapors from the fuel system 10. The purge solenoid 34 is electrically connected to a source of power (not shown). The fuel system 10 includes a purge line 36 fluidly connected to the vapor canister 30 and the purge solenoid 34 and a purge line 38 fluidly connected to the purge solenoid 34 and a manifold (not shown) of the engine. It should be appreciated that the purge solenoid 34 is conventional and known in the art.

The fuel system 10 also includes a solenoid valve assembly, according to the present invention and generally indicated at 40, to act as a canister vent valve for the vapor canister 30. The solenoid valve assembly 40 is fluidly connected to a source of air (not shown) by an air line 42 and to the vapor canister 30 by an air line 44. The solenoid valve assembly 40 is electrically connected to the source of power. The solenoid valve assembly 40 is cycled to provide outside filtered air to a bottom of the canister bed.

In a traditional operation of the fuel system 10, a leak test is performed by closing the solenoid valve assembly 40 while drawing a vacuum from the manifold of the engine through the purge solenoid 34 to the vapor canister 30 and fuel tank 12. A pressure transducer (not shown) monitors the vacuum level throughout the test. Once a target vacuum level is reached, the purge solenoid 34 closes to seal the fuel system 10. If the vacuum level decays too quickly, then a leak is presumed to exist. However, heavy sloshing of the fuel and rapid heat builds due to hot return fuel from the engine can cause the vacuum to decay without a leak, thus providing a false test. Splash cooling from driving through a cold puddle and heavy fuel use lowering the liquid level during a test can increase vacuum, thus potentially covering up a small leak and providing a false test. It should be appreciated that non-rigid fuel tanks can deform during the test also causing inaccuracies.

A better test is to wait until the engine is turned off. Most trips of reasonable length will have caused heating of the fuel well beyond the ambient temperature. Once the engine is turned off, the vent solenoid valve 40 can be closed and natural cooling will cause a vacuum to form. It should be appreciated that both temperature and pressure may be monitored to ensure that the change in vacuum is appropriate.

Figure 2:
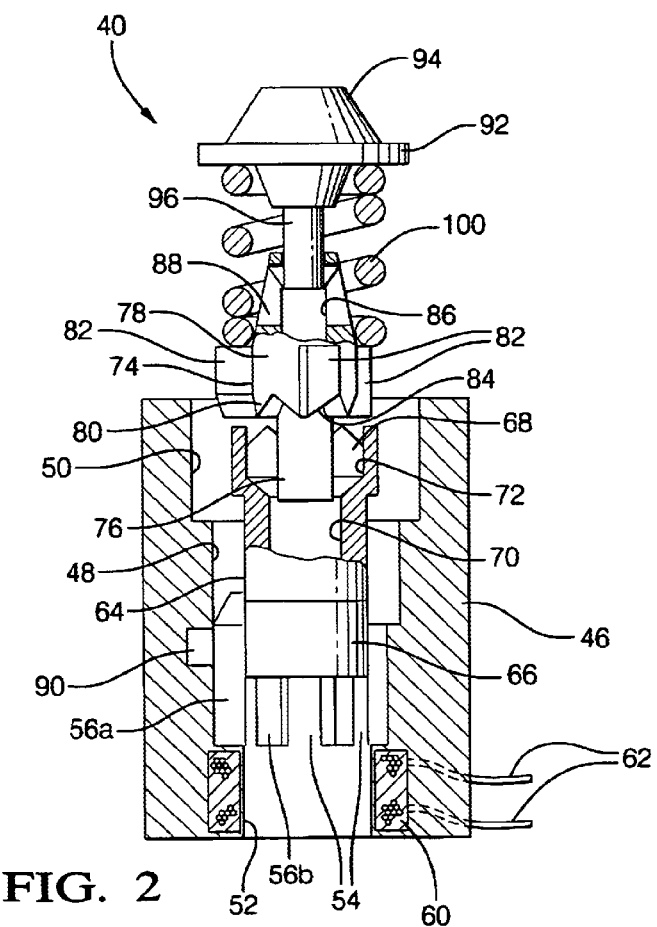
FIG. 2 is a fragmentary elevational view of a solenoid valve assembly, according to the present invention, for the fuel system of FIG. 1.

Referring to FIGS. 2 through 3B, the solenoid valve assembly 40, according to the present invention, includes a barrel 46. The barrel 46 is generally cylindrical in shape with a generally circular cross-section. The barrel 46 has a passageway 48 extending axially therethrough. The passageway 48 has an enlarged or large diameter opening 50 at an upper end thereof and a reduced or small diameter opening 52 at a lower end thereof. The barrel 46 has a plurality of ribs 54 disposed in a middle section of the passageway 48. The ribs 54 extend axially and are spaced circumferentially about the passageway 48 to form grooves or slots 56 therebetween. The grooves 56 between the ribs 54 alternate between full depth grooves 56a and half depth grooves 56b for a function to be described. Each of the ribs 54 has an inclined surface or ramp 58 at the top thereof for a function to be described. The barrel 46 is made of a rigid material such as plastic.

The solenoid valve assembly 40 includes a solenoid 60 at the lower end of the barrel 46. The solenoid 60 is disposed about the reduced opening 52 and secured to the barrel 46 by suitable means. The solenoid 60 is connected via wires 62 to a source of power (not shown) such as a controller (not shown) or vehicle battery (not shown).

Referring to FIGS. 2, 4A, and 4B, the solenoid valve assembly 40 also includes a plunger 64 movable relative to the barrel 46. The plunger 64 is generally cylindrical in shape with a generally circular cross-section. The plunger 64 is disposed in the passageway 48. The plunger 64 has a ferro-magnetic portion 66 at a lower end thereof. The plunger 64 also has a plurality of tabs 68 at an upper end thereof. The tabs 68 extend axially and are spaced circumferentially about the top of the plunger 64. The tabs 68 are generally rectangular in shape with an inverted "V" shape or point at an upper end thereof. The tabs 68 at top of the plunger 64 are of an even number of uniformly distributed points forming a "crown" shape at the top of the plunger 64 for a function to be described. The plunger 64 has a cavity 70 extending axially into the top thereof with an enlarged opening 72 for a function to be described. It should be appreciated that the half depth grooves 56b receive the tabs 68 of the plunger 64. It should also be appreciated that the portion 66 of the plunger 64 slides freely in the reduced diameter portion 52 but not the tabs 68. It should further be appreciated that the tabs 68 protrude at multiple locations to ride in the grooves 56 of the barrel 46, allowing the plunger 64 to move vertically, but not to rotate.

Figure 5:
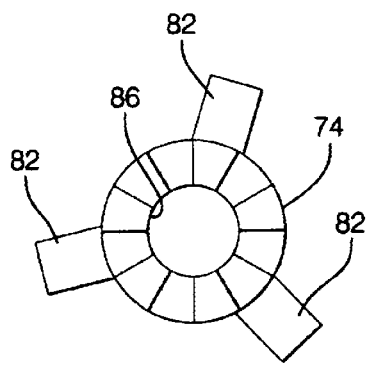
FIG. 5A is a plan view of a latch of the solenoid valve assembly of FIG. 2.
FIG. 5B is a fragmentary elevational view of the plunger of FIG. 5A.
Figure 5:
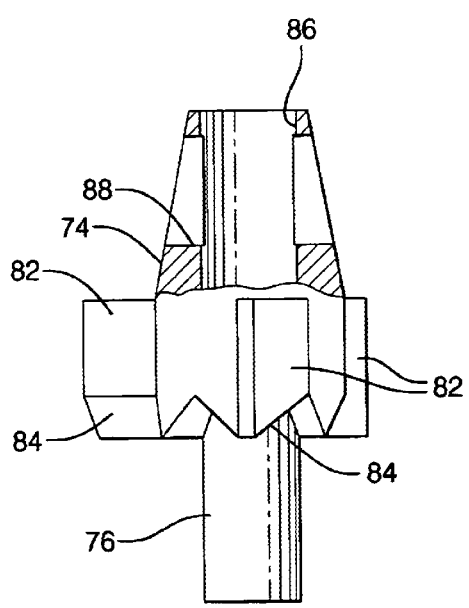

Referring to FIGS. 2, 5A, and 5B, the solenoid valve assembly 40 further includes a latch 74 movable relative to the plunger 64. The latch 74 is generally cylindrical in shape with a generally circular cross-section. The latch 74 has a thin base or lower end 76 disposed in the cavity 70 to slide therein. The latch 74 also has an enlarged upper end 78 with a generally inverted frusto-conical shape. The upper end 78 has a plurality of generally "V" shaped projections or points 80 spaced circumferentially thereabout to form a "crown" that mates with the crown on top of the plunger 64. The latch 74 also has a plurality of tabs 82 which extend beyond the tabs 68 of the plunger 64. The tabs 82 extend radially and are disposed circumferentially about the upper end 78. The tabs 82 have an inclined surface or ramp 84 that lines up with the saw-tooth pattern of the "crown". The upper end 78 also has a cavity 86 extending axially therein for a function to be described. The upper end 78 has an aperture 88 extending axially therethrough and communicating with the cavity 86 for a function to be described. It should be appreciated that the tabs 82 fit freely inside of the enlarged opening of the barrel 46 and are received within the full depth grooves 56a but not the half depth grooves 56b. It should also be appreciated that the ramps 84 on the tabs 82 matches the ramp 58 on the ribs 54 of the barrel 46. It should further be appreciated that the contact switch 90 may be incorporated into one of the full depth grooves 56a to determine whether the latch 74 is in the extended or retracted position.

Figure 6:
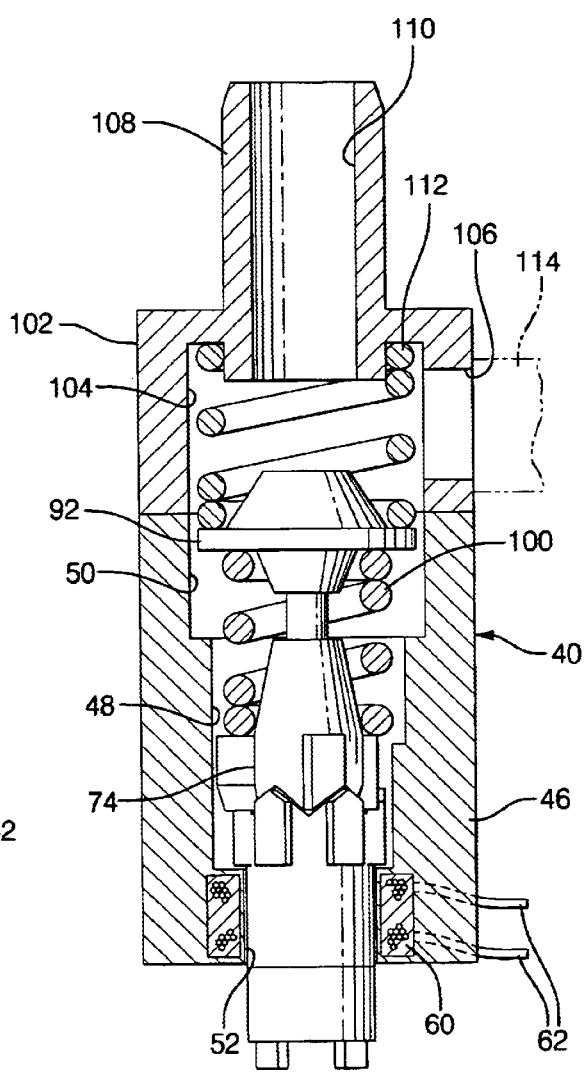
FIG. 6 is a sectional view of the solenoid valve assembly for the fuel system of FIG. 1 illustrating an open position.

Referring to FIGS. 2 and 6, the solenoid valve assembly 40 includes a vent closure plug 92 at an upper end of the latch 74. The vent closure plug 92 is generally circular in shape. The vent closure plug 92 has a tip 94 to seal a canister vent tube 102 to be described when closed. The tip 94 is made of an elastomeric material such as rubber. The plug 92 also has a shaft 96 extending axially with fins 98 that snap into the aperture of the latch 74 such that the plug 92 may slide freely up and down for a predetermined distance, but cannot separate from the latch 74.

The solenoid valve assembly 40 also includes a spring 100 to bias or urge the plug 92 to its maximum extension from the latch 74. The spring 100 is disposed between the vent closure plug 92 and the upper end of the latch 74. The spring 100 is preferably of a coil type.

The fuel system 10 may include a canister vent tube 102 connected to the solenoid valve assembly 40. The vent tube 102 is generally cylindrical in shape. The vent tube 102 has a cavity 104 extending axially therein and an aperture or open port 106 extending radially therein and communicating with the cavity 104. The vent tube 102 also includes a vent line 108 having a reduced diameter and extending axially from the other end thereof for connection to the air line 44. The vent line 108 is generally cylindrical in shape. The vent line 108 has a passageway 110 extending axially therethrough and communicating with the cavity 104. The fuel system 10 also includes a return spring 112 disposed within the cavity 104 of the vent tube 102 between the vent line 108 and the vent closure plug 92 of the solenoid valve assembly 40 for a function to be described. The return spring 112 is of a coil type. The fuel system 10 may include a filter 114 connected to the open port 106 of the vent tube 102 to keep dirt and/or moisture out of the fuel system 10.

Referring to FIG. 6, the solenoid valve assembly 40 is illustrated in a retracted or open position. The return spring 112 keeps the latch 74 seated in the barrel 46. Activating the solenoid 60 pulls the plunger 64 up enough for the tabs 82 of the latch 74 to clear the top of the ribs 48 on the barrel 46, the ramps 58 on the ribs 54 and the tabs 82 on the latch 74 cause the latch 74 to rotate one rib 54. The tabs 68 on the plunger 64 do not clear the top of the ribs 54. When the solenoid 60 is powered, the vent closure plug 92 is pressed firmly against the end of the canister vent line 108, with both springs 100,112 compressed. When power is discontinued to the solenoid 60, the latch 74 settles into either the open position or the closed position depending on its prior state. If the solenoid valve assembly 40 was open before actuating, then the solenoid valve assembly 40 will settle into the closed position after actuating. In the closed position, the tabs 82 of the latch 74 settle on the half depth grooves 56b in the barrel 46. When the latch 74 settles on the half depth grooves 56b, the latch 74 slides back slightly on the shaft 96 of the plug 92, reducing the compression of the spring 100. The tip 94 of the plug 92, however remains firmly engaged in the vent tube 102. In the event of excessive pressure in the fuel system 10, the spring 100 can act as a relief valve. When the solenoid 60 is again activated, the latch 74 rotates one rib 54 and when the power is discontinued, the tabs 82 of the latch 74 drop into the full depth grooves 56a. The latch 74 drops all the way down, pushed by the spring 112. The plug 92 is pushed away from the vent tube 102 by the spring 112. When the plug 92 is away from the vent tube 102, air can freely move from the vent line 108 to the open port 106.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A solenoid valve assembly comprising:
   a barrel;
   a solenoid disposed in said barrel for connection to a source of power;
   a movable plunger disposed in said barrel and cooperating with said solenoid; and
   a latch movable axially relative to said plunger and cooperating with said barrel to maintain said plunger in either one of an open state and closed state.

2. A solenoid valve assembly as set forth in claim 1 wherein said plunger has a ferromagnetic portion cooperating with said solenoid.

3. A solenoid valve assembly comprising:
   a barrel;
   a solenoid disposed in said barrel for connection to a source of power;
   a movable plunger disposed in said barrel and cooperating with said solenoid;
   a latch connected to said plunger and cooperating with said barrel to maintain said plunger in either one of an open state and closed state; and
   wherein said barrel has a plurality of ribs disposed therein and spaced circumferentially thereabout.

4. A solenoid valve assembly as set forth in claim 3 wherein said plunger has a plurality of first tabs spaced circumferentially thereabout.

5. A solenoid valve assembly as set forth in claim 4 wherein said barrel has a plurality of grooves spaced circumferentially thereabout, one of said grooves being disposed between a pair of said ribs.

6. A solenoid valve assembly as set forth in claim 5 wherein said grooves comprise a full depth groove and a half depth groove alternating, said full depth groove receiving said first tabs and said half depth grooves preventing entry of said first tabs.

7. A solenoid valve assembly as set forth in claim 5 wherein said ribs have a ramp portion at an upper end thereof.

8. A solenoid valve assembly as set forth in claim 5 including a contact switch disposed in one of said grooves to determine whether said plunger is in either one of an extended position and a retracted position.

9. A solenoid valve assembly as set forth in claim 4 wherein said latch has a plurality of second tabs spaced circumferentially thereabout.

10. A solenoid valve assembly as set forth in claim 9 wherein said first tabs extend axially and have a generally inverted V shape forming a first crown.

11. A solenoid valve assembly as set forth in claim 10 wherein said second tabs extend axially and have a generally V shape forming a second crown cooperating with said first crown.

12. A solenoid valve assembly as set forth in claim 10 wherein said second tabs have a ramp portion cooperating with said first tabs.

13. A solenoid valve assembly comprising:
    a barrel;
    a solenoid disposed in said barrel for connection to a source of power;
    a movable plunger disposed in said barrel and cooperating with said solenoid;
    a latch connected to said plunger and cooperating with said barrel to maintain said plunger in either one of an open state and closed state; and
    wherein said plunger has a cavity extending axially therein and said latch has a shaft portion disposed in said cavity for sliding movement therein.

14. A solenoid valve assembly for a vehicle comprising:
    a barrel;
    a solenoid disposed in said barrel for connection to a source of power;
    a movable plunger disposed in said barrel and cooperating with said solenoid;
    a latch connected to said plunger and cooperating with said barrel to maintain said plunger in either one of an open state and closed state; and a closure plug connected to said latch to open and close a vent tube connected to a vapor canister.

15. A solenoid valve assembly as set forth in claim 14 including a spring disposed between said closure plug and said latch to urge said closure plug to a maximum extension from said latch.

16. A solenoid valve assembly as set forth in claim 14 wherein said plunger has a ferromagnetic portion cooperating with said solenoid.

17. A solenoid valve assembly as set forth in claim 14 wherein said barrel has a plurality of ribs disposed therein and spaced circumferentially thereabout.

18. A solenoid valve assembly as set forth in claim 17 wherein said plunger has a plurality of first tabs spaced circumferentially thereabout.

19. A solenoid valve assembly as set forth in claim 18 wherein said barrel has a plurality of grooves spaced circumferentially thereabout, one of said grooves being disposed between a pair of said ribs.

20. A solenoid valve assembly as set forth in claim 19 wherein said grooves comprise a full depth groove and a half depth groove alternating, said full depth groove receiving said first tabs and said half depth grooves preventing entry of said first tabs.

21. A solenoid valve assembly as set forth in claim 17 wherein said ribs have a ramp portion at an upper end thereof.

22. A solenoid valve assembly as set forth in claim 19 including a contact switch disposed in one of said grooves to determine whether said plunger is in either one of an extended position and a retracted position.

23. A solenoid valve assembly as set forth in claim 18 wherein said latch has a plurality of second tabs spaced circumferentially thereabout.

24. A solenoid valve assembly as set forth in claim 23 wherein said first tabs extend axially and have a generally inverted V shape forming a first crown.

25. A solenoid valve assembly as set forth in claim 24 wherein said second tabs extend axially and have a generally V shape forming a second crown cooperating with said first crown.

26. A solenoid valve assembly as set forth in claim 25 wherein said second tabs have a ramp portion cooperating with said first tabs.

27. A solenoid valve assembly as set forth in claim 14 wherein said plunger has a cavity extending axially therein and said latch has a shaft portion disposed in said cavity for sliding movement therein.

28. A fuel system for a vehicle comprising:

a fuel tank to hold fuel therein;

a vapor canister communicating with said fuel tank to absorb vapor fuel from said fuel tank;

a first conduit interconnecting said vapor canister and said fuel tank and a second conduit connected to said vapor canister and for connection to a source of air;

a solenoid valve assembly connected to said second conduit between said vapor canister and the source of air comprising:

a barrel;

a solenoid disposed in said barrel for connection to a source of power;

a movable plunger disposed in said barrel and cooperating with said solenoid;

a latch connected to said plunger and cooperating with said barrel to maintain said plunger in either one of an open state and closed state; and a closure plug connected to said latch to open and close fluid communication between said first vapor canister and the source of air.

* * * * *